United States Patent Office 3,721,688
Patented Mar. 20, 1973

3,721,688
QUATERNARY AMMONIUM SALTS OF 17α-
AMINOALKYNYL - 19 - NORSTEROIDAL
3,5-DIENES
Gerhard R. Wendt, Haverton, Kurt W. Ledig, Philadelphia, and Donald W. Oliver, Phoenixville, Pa., assignors to American Home Products Corporation, New York, N.Y.
No Drawing. Continuation-in-part of application Ser. No. 796,909, Feb. 5, 1969. This application Mar. 30, 1970, Ser. No. 24,039
The portion of the term of the patent subsequent to Apr. 20, 1988, has been disclaimed
Int. Cl. C07c *169/20*
U.S. Cl. 260—397.5         6 Claims

ABSTRACT OF THE DISCLOSURE

Novel biocidal steroidal quaternary ammonium salts have been prepared which are useful as amebicides, tricomonacides, fungicides, bactericides and nematocides.

CROSS-REFERENCE TO RELATED APPLICATIONS

This application is a continuation-in-part of U.S. Pat. 3,575,967, filed Feb. 5, 1969 and granted April 20, 1971. The quaternary ammonium salts of this invention are produced from compounds disclosed in U.S. 3,575,967, which patent is hereby incorporated by reference.

DESCRIPTION OF THE INVENTION

This invention contemplates compounds of Formula I.

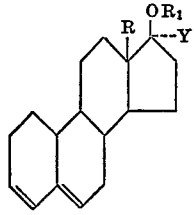

I wherein R is alkyl of from 1 to 5 carbon atoms; $R_1$ is hydrogen or alkanoyl of from 2 to 5 carbon atoms and Y is

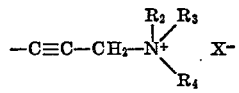

wherein $R_2$ is selected from the group consisting of phen(lower)alkyl and alkyl of from 1 to about 18 carbon atoms; $R_3$ and $R_4$ are independently alkyl of from 1 to about 5 carbon atoms; X is halogen.

Special mention is made of a number of particularly valuable embodiments of this invention:

*dl*-diethyl[3-(13-ethyl-17-hydroxygona-3,5-dien-17α-yl)-2-propynyl]methyl ammonium iodide;
*dl*-[3-(13-ethyl-17-hydroxygona-3,5-dien-17α-yl)-2-propynyl]trimethyl ammonium iodide;
*dl*-[3-(13-ethyl-17-hydroxygona-3,5-dien-17α-yl)-2-propynyl]dimethyl pentyl ammonium bromide;
dl-diethyl[3-(13-ethyl-17-hydroxygona-3,5-dien-17α-yl)-2-propynyl]pentyl ammonium iodide; and
*dl*-benzyl[3-(13-ethyl-17-hydroxygona-3,5-dien-17α-yl)-2-propynyl]dimethyl ammonium iodide.

When used herein the term "alkanoyl of from 2 to 5 carbon atoms," contemplates lower alkanoyl radicals such as acetyl, propionyl, butyroyl and pentanoyl. The terms "halo" and "halogen" are used to include chloro, bromo, fluoro and iodo.

The compounds of the invention are prepared as follows:

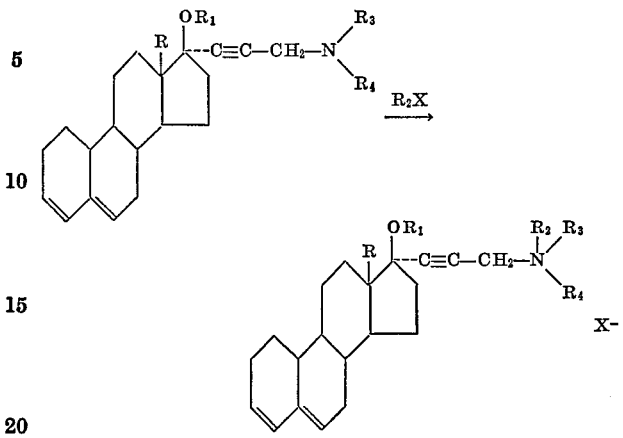

wherein R, $R_1$, $R_2$, $R_3$, $R_4$ and X are the same as hereinabove described.

The reactants are combined in an organic solvent such as ether, acetonitrile, methanol, dimethylformamide, etc. The reaction may be conducted at room temperature or under reflux conditions.

The compounds of the invention are biologically active as bactericides, fungicides, amebicides, trichomonacides and nematocides.

Of special interest is the high in vivo amebicidal activity of the novel compounds of the invention.

The following in vivo procedure has been employed in evaluating the invention.

A laparotomy is performed on anesthetized, pathogen-free albino rats, their caecums exposed and approximately 15,000 trophozoites of *Endamoeba histolytica* are injected into the lumen of the caecum. After 24 hours, healthy survivors are randomized into treatment groups and dosing is initiated. Dosing is oral, once daily for four days. On the fiftieth day the animals are sacrificed their caecums removed and washed clean with saline. Caecal walls are scraped and the scraping mounted on a microscope slide and examined at 200× magnification. Eight rats are employed in this test.

No amoeba were observed in test subjects that were treated per os for four days with a daily dose of 400 mg./kg. of body weight.

The following examples are added to illustrate but not to limit the scope of the invention:

EXAMPLE I

*dl*-Diethyl[3-(13-ethyl-17-hydroxygona-3,5-dien-17α-61)
2-propynyl]methyl ammonium iodide To a solution of 910 mg. of *dl*-17-(3-diethylamino-1-propynyl)-13-ethylgona - 3,5 - dien - 17β-ol, in ether was added 1 ml. of methyl iodide. The reaction mixture was kept at room temperature for 20 hours and the resulting precipitate filtered to give 600 mg. of the title compound; M.P. 140–150° C.

Found (percent): C, 61.36; H, 7.86; N, 2.38. $C_{27}H_{42}NOI$ requires (percent): C, 61.93; H, 8.08; N, 2.67. UV (95% ethanol) λ max. 222 mμ (ε 27,000)

EXAMPLE II

*dl*-[3-(13-ethyl-17-hydroxygona-3,5-dien-17α-yl)-2-propynyl]-trimethyl ammonium iodide To a solution of 900 mg. of *dl*.-17-(3-dimethylamino-1-propynyl) - 13 - ethylgona-3,5-dien-17β-ol in ether was added 1 ml. of methyl iodide. After keeping the reaction mixture for 20 hours at room temperature the resulting precipitate was filtered to give 500 mg. of the title compound, M.P. 254° C.

Found (percent): C, 60.33; H, 7.45; I, 25.18; $C_{25}H_{38}NOI$ requires (percent): C, 60.59; H, 7.73; I, 25.61.

EXAMPLE III dl-[3-(13-ethyl-17-hydroxygona-3,5-dien-17α-yl)-2-propynyl]-dimethyl pentyl ammonium bromide A suspension of 900 mg. of dl-17-(3-dimethylamino-1-propynyl)-13-ethylgona-3,5-dien-17β-ol, 50 ml. of acetonitrile and 1 ml. of bromopentane was refluxed for 5 hours. The material was filtered off to give after recrystallization from methanol 700 mg. of the title compound; M.P. 278° C. dec.

Found (percent): C, 69.24; H, 9.15; N, 2.92; Br, 15.69. $C_{29}H_{46}NOBr$ requires (percent): C, 69.02; H, 9.18, N, 2.78; Br, 15.83.

EXAMPLE IV dl-benzyl[3-(13-ethyl-17-hydroxygona-3,5-dien-17α-yl)-2-propynyl]pentyl ammonium iodide A solution dl-17-(3-diethylamino-1-propynyl)-13-ethylgona-3,5-dien-17β-ol in 30 ml. of acetonitrile, which had been prepared from its hydrochloride salt, was treated with 1 ml. of iodopentane and the reaction mixture refluxed for 4 hours. On cooling there was obtained a 1.4 g. yield of the title compound; M.P. 216–217° C.

Found (percent): C, 64.12; H, 8.38; N, 2.22; I, 22.39. $C_{31}H_{39}NIO$ requires (percent): C, 64.23; H, 8.69; N, 2.42; I, 21.89.

EXAMPLE V dl-diethyl[3-(13-ethyl-17-hydroxygona-3,5-dien-17α-yl)-2-propynyl]-dimethyl ammonium chloride The base obtained from 1.5 g. of dl-17-(3-dimethylamino-1-propynyl)-13-ethylgona-3,5-dien-17β - ol, hydrochloride was dissolved in 30 ml. of methanol and 1 ml. of dimethylformamide and after the addition of 1 ml. of benzylchloride refluxed for 20 hours. The precipitate obtained on addition of ether was recrystallized from methanol/ether to yield 800 mg. of the title compound; M.P. 185–195° C. dec.

Found (percent): C, 75.86; H, 8.68; N, 3.10; Cl, 7.56. $C_{31}H_{42}ClNO \cdot \frac{1}{2}H_2O$ requires (percent): C, 76.12; H, 8.86; N, 2.86; Cl, 7.25.

EXAMPLE VI

The procedure of Example III is repeated substituting stoichiometrical amounts of appropriately alkyl halides and phen(lower)alkyl halides:

wherein R, $R_1$, $R_2$, $R_3$, $R_4$ and X are as follows:

| R | $R_1$ | $R_2$ | $R_3$ | $R_4$ | X |
|---|---|---|---|---|---|
| $CH_3$ | $C_2H_5$ | $C_2H_5$ | $C_2H_5$ | $C_2H_5$ | Cl |
| $C_2H_5$ | $C_3H_7$ | $CH_3$ | $CH_3$ | $CH_3$ | I |
| $C_3H_7$ | $C_4H_9$ | $C_3H_7$ | $CH_3$ | $CH_3$ | I |
| $C_4H_9$ | $CH_3$ | $C_{12}H_{25}$ | $CH_3$ | $CH_3$ | F |
| $CH_3$ | $C_2H_5$ | $C_{16}H_{33}$ | $C_2H_5$ | $C_2H_7$ | Br |
| $CH_3$ | $CH_3$ | $C_4H_9$ | $CH_3$ | $C_2H_5$ | I |
| $C_2H_5$ | $C_2H_5$ | $C_9H_{19}$ | $C_2H_5$ | $C_2H_5$ | I |
| $CH_3$ | $C_2H_5$ | $C_4H_9$ | $C_4H_9$ | $C_4H_9$ | I |
| $C_2H_5$ | $CH_3$ | $CH_3$ | $C_5H_{11}$ | benzyl-$CH_2$- | I |

We claim:

1. A compound selected from the group consisting of:

wherein R is alkyl of from 1 to 5 carbon atoms; $R_1$ is hydrogen or alkanoyl of from 2 to 5 carbon atoms and Y is $$-C\equiv C-CH_2-\overset{R_2\;R_3}{\underset{R_4}{N^+}}\quad X^-$$

wherein $R_2$ is selected from the group consisting of phen(lower)-alkyl and alkyl of from 1 to about 18 carbon atoms; $R_3$ and $R_4$ are independently alkyl of from 1 to about 5 carbon atoms; X is halogen.

2. A compound as defined in claim 1 which is: dl-diethyl[3 - (13 - ethyl - 17 - oxygona - 3,5-dien-17α-yl)-2-propynyl]-methyl ammonium iodide.

3. A compound as defined in claim 1 which is: dl-[3-(13 - ethyl-17-hydroxygona-3,5-dien-17α-yl)-2-propynyl]-trimethyl ammonium iodide.

4. A compound as defined in claim 1 which is: dl-[3-(13 - ethyl-17-hydroxygona-3,5-dien-17α-yl)-2-propynyl]-dimethyl pentyl ammonium bromide.

5. A compound as defined in claim 1 which is: dl-diethyl[3 - (13 - ethyl - 17 - hydroxygona-3,5-dien-17α-yl)-2-propynyl]pentyl ammonium iodide.

6. A compound as defined in claim 1 which is: dl-benzyl[3 - (13 - ethyl - 17-hydroxygona-3,5-dien-17α-yl)-2-propynyl]dimethyl ammonium chloride.

References Cited

UNITED STATES PATENTS 3,575,967  4/1971  Ledig et al. ———— 260—397.5
3,536,703  10/1970  Coltan et al. ———— 260—239.5
3,553,211  1/1971  Ellis et al. ———— 260—239.5

ELBERT L. ROBERTS, Primary Examiner

U.S. Cl. X.R.

424—238